(12) United States Patent
Typppoe et al.

(10) Patent No.: US 7,319,521 B2
(45) Date of Patent: Jan. 15, 2008

(54) MEASURING DEVICE

(75) Inventors: Pekka Typpoe, Cupertino, CA (US);
Rudolf Muench, Koenigsbronn (DE);
Thomas Ischodonat, Bachhagel (DE);
Ray Shead, Kent (GB)

(73) Assignee: Voith Paper Patent GmbH, Heidenheim (DE)

( * ) Notice: Subject to any disclaimer, the term of this patent is extended or adjusted under 35 U.S.C. 154(b) by 378 days.

(21) Appl. No.: 11/024,331

(22) Filed: Dec. 22, 2004

(65) Prior Publication Data

US 2005/0157314 A1 Jul. 21, 2005

(30) Foreign Application Priority Data

Dec. 22, 2003 (DE) ................... 103 61 161

(51) Int. Cl.
*G01N 21/84* (2006.01)
(52) U.S. Cl. ..................... 356/430; 356/630
(58) Field of Classification Search ............ 356/430, 356/485, 630, 908, 402, 429, 243.5, 399–401; 702/22–28; 250/560–561, 201.5, 559.3, 250/548
See application file for complete search history.

(56) References Cited

U.S. PATENT DOCUMENTS

| | | | |
|---|---|---|---|
| 4,276,480 A | 6/1981 | Watson | 250/560 |
| 4,773,760 A | 9/1988 | Makkonen | 356/381 |
| 5,162,661 A | 11/1992 | Sato et al. | 250/561 |
| 5,661,671 A * | 8/1997 | Ooenoki et al. | 703/7 |
| 5,714,763 A | 2/1998 | Chase et al. | 250/559.3 |
| 6,281,679 B1 | 8/2001 | King et al. | 324/229 |
| 6,588,118 B2 * | 7/2003 | Hellstrom | 33/501.02 |
| 6,743,338 B2 | 6/2004 | Graeffe et al. | 162/198 |

FOREIGN PATENT DOCUMENTS

DE 19913928 9/2000

* cited by examiner

*Primary Examiner*—Gregory J. Toatley, Jr.
*Assistant Examiner*—Tri Ton
(74) *Attorney, Agent, or Firm*—Taylor & Aust, P.C.

(57) ABSTRACT

A device for measuring the thickness of a sheet or web product including at least one moveable measuring sensor which can be pressed against the product while forming an air pad between measuring sensor and product. At least one measuring sensor is respectively provided on both sides of the sheet or web product. The thickness of the respective air pad can be measured, the total gap thickness including the thickness of the two air pads and the product thickness can be measured. Elements are provided for calculating the product thickness by subtracting the thickness of the air pad on the two product sides from the measured total gap thickness.

25 Claims, 4 Drawing Sheets

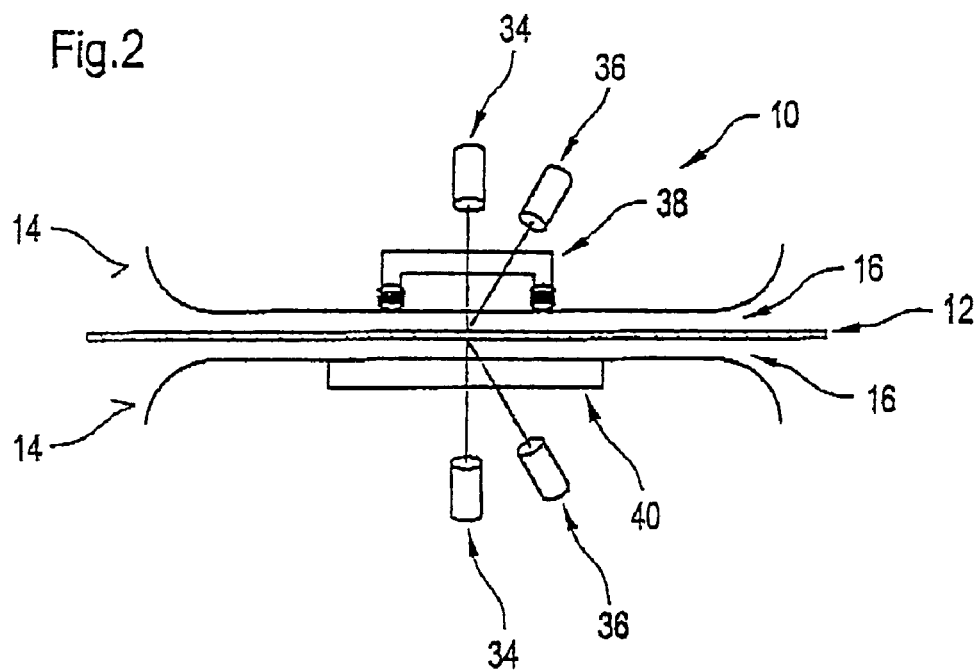
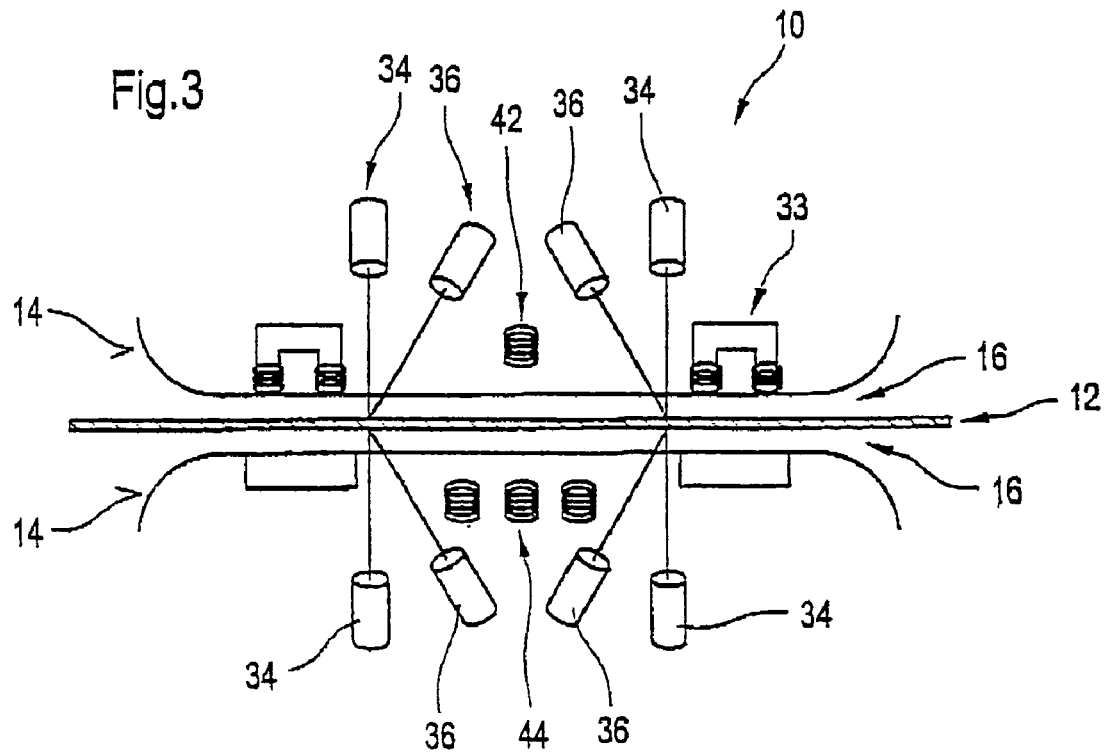

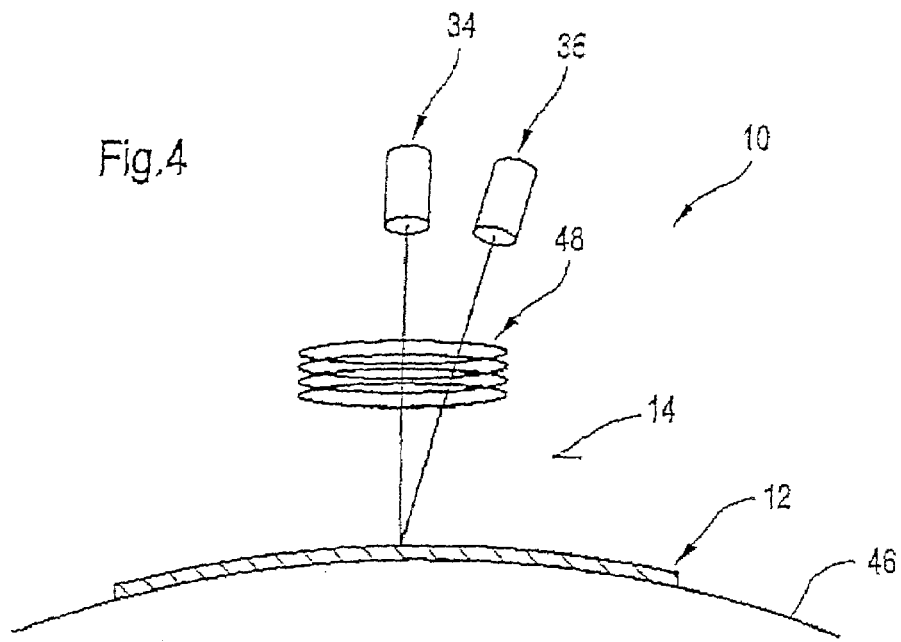
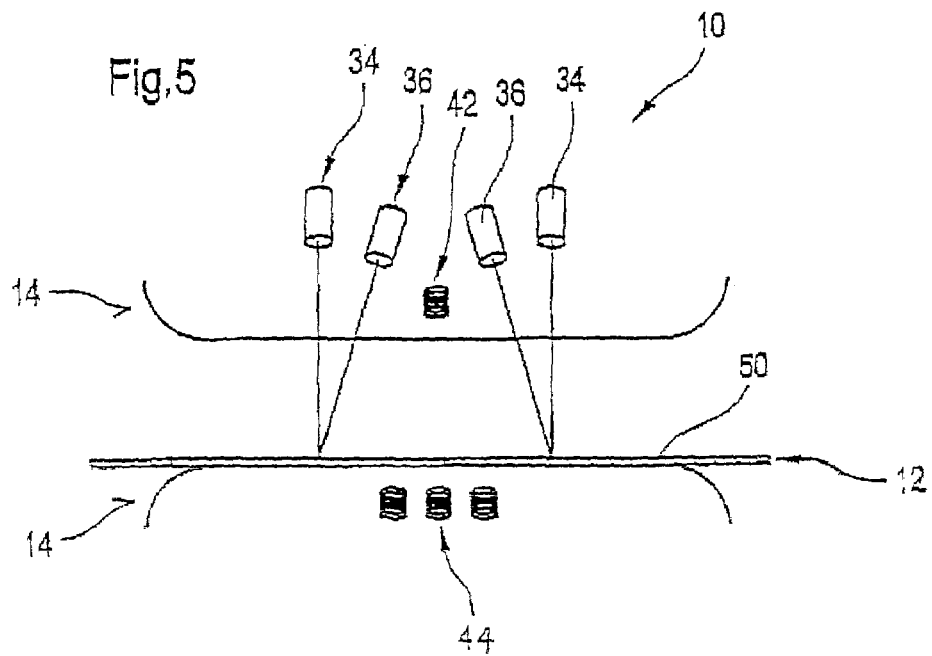

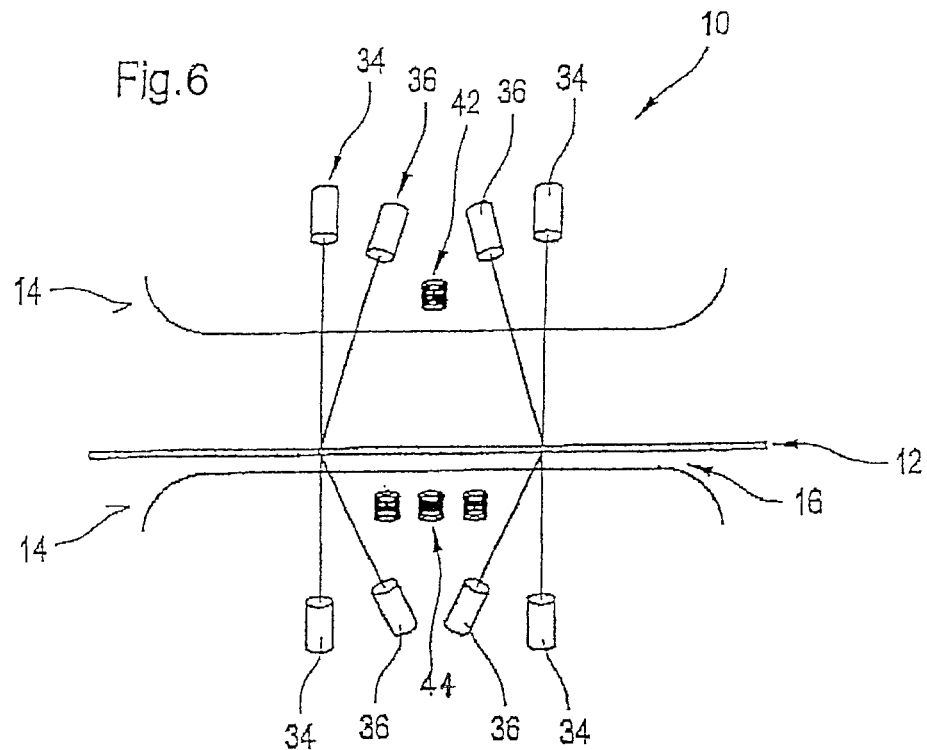
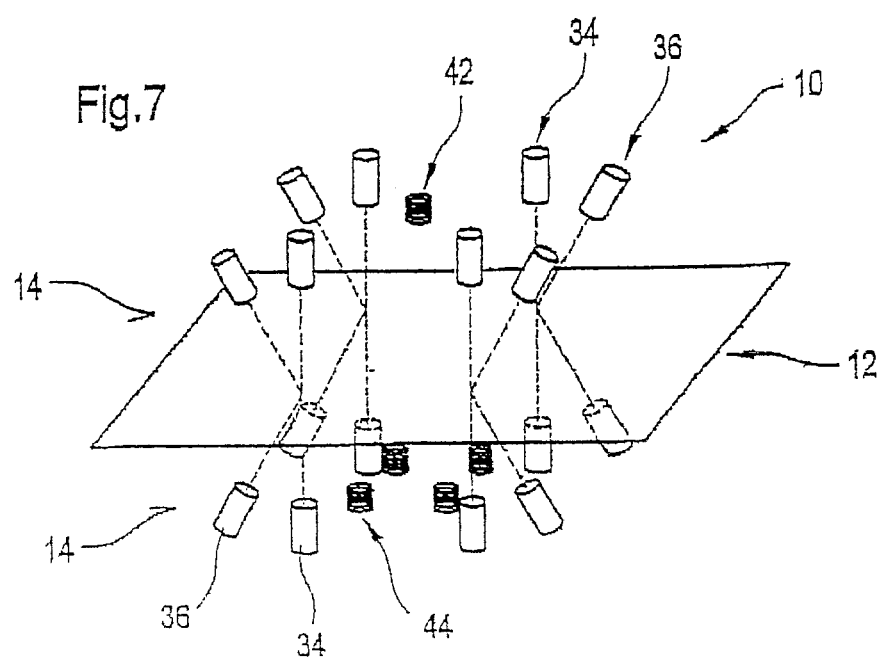

MEASURING DEVICE

BACKGROUND OF THE INVENTION

1. Field of the Invention

The present invention relates to a device for measuring the thickness (caliper) of a sheet or web material. The latter can be, in particular, a moving material web and, for example, a moving fibrous web such as, in particular, a paper or board web.

2. Description of the Related Art

Previously known devices for measuring the thickness of paper are based on the three following measuring principles:
1. Contacting thickness sensor.

The current contacting thickness sensors are certainly very accurate. However, since they are in contact with the abrasive material web moving at high speed, which can be, for example, newsprint made of secondary material with $CaCO_3$ filler, the contacting elements wear away very quickly. These sensors also frequently produce holes in the material web when the measuring sensors strike the web, and produce corresponding faults. In the case of matt coatings or high-gloss grades, the sensor sometimes produces markings on the web.

2. Air pad thickness sensor.

Air pad thickness sensors neither exhibit premature wear phenomena nor do they produce oles or other markings on the material web. However, they are not sufficiently accurate for newsprint or fine paper, which can be attributed to the instability with respect to the air pad thickness.

3. Laser thickness sensor using the laser triangulation method.

Laser thickness sensors operating on the basis of the triangulation method likewise exhibit no premature wear phenomena, nor do they produce holes or markings in or the sheet or the web. A laser measures the distance to the product web or the material web from both sides, and a magnetic sensor measures the thickness of the total measuring gap. The thickness of the material web is calculated by the laser measured values being subtracted from the magnetic measured value. The requisite repeatability for fine paper and newsprint lies in the range of about 0.25 µm. Even when there is no further source of error, a magnetic measurement for a 10 mm gap must have a repeatability of at least 1 in 40,000. The other error source includes the fact that, when the sheet to be measured is not exactly parallel with the gap, even a small misalignment between the upper and lower measuring head can entail a significant error. If the tangent of the angle between the sheet or the web and the measuring head is only 0.01, then the alignment error between he measuring heads must remain below 0.025 mm in order to achieve the 0.25 µm epeatability. The best scanning frames which can currently be obtained can maintain about 0.2 mm. The standard laser thickness measurement based on the triangulation method operates well only in the case of thick products but not in the case of lightweight, thinner sheets.

What is needed in the art is a device for measuring the thickness of a material web which does not mark or damage the web, which does not wear out prematurely, and which is sufficiently accurate and precise.

SUMMARY OF THE INVENTION

The present invention provides an improved measuring device for measuring the thickness of a sheet or material web. The present invention includes a non-contact thickness sensor which does not mark or damage the sheet or web product, as is sometimes the case with contacting thickness sensors, and which does not wear out prematurely like a contacting sensor. In addition, otherwise than in the air pad thickness sensor and the laser sensor operating on the basis of the triangulation method, sufficient accuracy for use in lighter weight papers is achieved.

The present invention comprises, in one form thereof, a device for measuring the thickness of a sheet or web product having at least one moveable measuring sensor which can be pressed against the product while forming an air pad between measuring sensor and product. In this case, at least one measuring sensor is respectively provided on both sides of the sheet or web product. Measuring sensors provided on different sides of the sheet or web product can be pressed against the product with at least substantially the same force. The thickness of the respective air pad can be measured, the total gap thickness including the thickness of the two air pads and the product thickness can be measured, and elements are provided for calculating the product thickness by subtracting the thickness of the air pad on the two product sides from the measured total gap thickness.

According to a further aspect, the present invention provides a device for measuring the thickness of a sheet or web product, having a stationary measuring sensor with a laser distance sensor on one product side, and having a roll or a stationary surface against which the sheet or web product can be pressed. A laser measurement is carried out from one side to the product surface, and also a measurement of the total gap thickness, and elements being provided for calculating the product thickness by subtracting the laser measured value from the measured value of the total gap thickness.

According to a further alternative solution, the present invention provides a device for measuring the thickness of a sheet or web product, having stationary measuring sensors on opposite product sides, it being possible for the sheet or web product to be pressed against a stationary measuring sensor while forming an air pad. Elements for a laser measurement of the air pad thickness on one product side are included. Elements for a laser measurement, in particular of the distance from the measuring sensor on the opposite product side to the product surface, with elements for measuring the total gap thickness are included with elements for calculating the product thickness by subtracting the laser measured value from the measured value of the total gap thickness.

According to a further aspect, the present invention provides a device for measuring the thickness of a sheet or web product, having stationary measuring sensors on opposite product sides, with elements for a laser distance measurement from measuring sensors provided on both product sides to the product surface. More than one laser measurement is carried out on at least one product side in order to determine the angle between the product and the measuring sensor. Elements for measuring the alignment between the measuring sensors to be used are included, it being possible for this alignment measurement to be used together with the angle measurement to correct the misalignment. Elements for measuring the thickness of the total gap between the measuring sensors are included. Elements for calculating the product thickness by subtracting the air pad thickness from the measured value of the total gap thickness are included.

Preferred embodiments of these alternative solutions according to the present invention are specified in the dependent claims.

The present invention can be used as a stabilized measuring structure which can be used for the simultaneous support of a plurality of sensors. For example, mention is made of gloss measurement, which is likewise an optical measurement and which reacts sensitively to sheet flutter in the measuring gap. The laser thickness sensor according to the present invention stabilizes the sheet in a small measuring gap and can thus also be used as a measuring structure for a gloss measurement. Further measurement examples which can profit from this stabilized measuring structure are, for example, formation, roughness, fiber orientation, ash content, grammage and moisture.

In connection with measuring the grammage or the ash content, the measuring gap is expediently closed only from one side. This denotes that, for example, the receiving side of the measuring unit is stationary on a measuring platform at a defined small distance from the product, and the side having the radiation source is stationary with a conventional spacing of a few millimeters (e.g. 10 mm). This reduces the air column in the measuring gap and therefore improves the accuracy of the measurements based on radiometric measurements. Since the gap is, moreover, measured or even monitored or controlled, the effect of the small remaining air column on the measurement can be estimated and subtracted from the total signal in order to obtain an accurate measurement of the grammage of the sheet.

Even if not all the elements of the device according to the present invention are used, the result is still a considerable improvement as compared with current measuring units. One example which may be mentioned is the measurement of the passage angle of the sheet passing through the measuring gap by way of using a plurality of sensors (e.g. based on lasers), in order to measure the air pad thickness at a plurality of points. The passage angle represents a useful item of information in many optical sensors which, nowadays, are based on the fact that no passage angle variation occurs or sheet flutter exists. This applies even when the air pads are too large in order actually still to be designated air pads, for example when these are of the order of several millimeters, as is the case in most conventional sensors.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a schematic view of another embodiment of the measuring device, having lasers and position measuring sensors provided on both product sides according to the present invention;

FIG. 3 is a schematic view of a further embodiment of the measuring device, in which a plurality of sensors are provided for measuring the total gap thickness, in order to measure and compensate for the errors which have arisen as a result of a nonuniform gap between the measuring sensors according to the present invention;

FIG. 4 is a schematic view of a further embodiment of a measuring device, in which the sheet or web product is pressed against a roll according to the present invention;

FIG. 5 is a schematic view of a further embodiment of the measuring device, in which the sheet or web product is pressed against a stationary surface according to the present invention;

FIG. 6 is a schematic view of a further embodiment of the measuring device, having stationary measuring sensors provided on both product sides according to the present invention; and FIG. 7 is a schematic view of a further embodiment of the measuring device, having stationary measuring sensors provided on both product sides according to the present invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
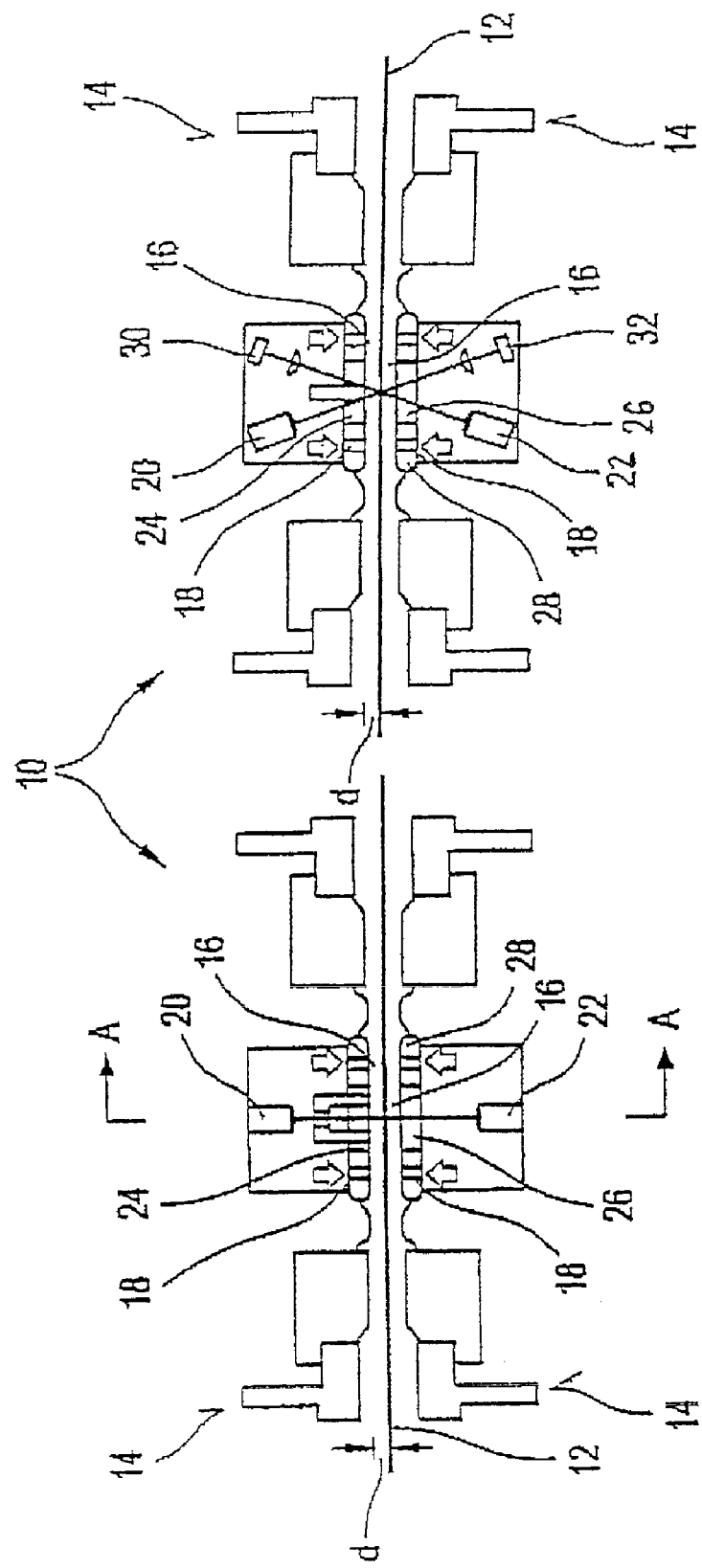
FIG. 1 is a schematic view of an embodiment of the measuring device, having measuring sensors provided on both product sides according to the present invention.

Referring now to the drawings, and more particularly to FIG. 1, there is shown a device 10 for measuring the thickness of a sheet or web product 12, which can be, for example, a material web, in particular, a fiber web such as a paper or board web, in particular one which is moving.

This embodiment includes movable measuring sensors 14 on the two product sides with air pads 16 in order to avoid contact with product 12. Measuring sensors 14 are pressed against product 12 with regulated force. The relevant force can be produced in different ways, for example compressed air actuation, actuation via the torque of a motor, magnetic actuation and so on being conceivable. The sensor measures the thickness of the total measuring gap by way of a coil and a ferrite core on one side of the product and a passive ferrite disk on the other product side.

The active coil can be arranged either on the upper or on the lower measuring head. This part of the sensor corresponds to a thickness sensor as described, for example, in EP 0 299 716. The total gap in the case of the magnetic measurement by using this method is the product thickness plus the two air pads, which are typically less than 0.5 mm. This gap can be measured very accurately. Many other methods for measuring the thickness of the total gap are possible.

A laser triangulation method is applied in order to measure the air pad thickness on both sides of the sheet or web product. This measurement can also be carried out very accurately. The linear arrangement of detectors shown in FIG. 1 can be replaced by other types of position detectors. The lasers used are preferably blue or violet laser diodes, which produce rather small measuring points. Shortwave light is advantageous since in this case the penetration depth into the product is low. The lasers present on the different product sides are clocked at different times in order to avoid crosstalk. The product thickness is calculated by subtracting the air pad thicknesses from the total thickness.

Forming the air pads stabilizes the sheet or web product and holds the measuring sensors and the product parallel to one another, so that errors with regard to the sensor alignment are eliminated or largely reduced.

The sensor can also be compensated with respect to alignment.

For example, in some cases it may occur that the sheet or web product is not exactly parallel to the measuring sensors, which, for example, can be traced back to relatively large curvature of the sheet, although the formation of air pads reduces deviations to a great extent. In the machine running direction, the sheet or web product or the relevant material web is normally completely straight on account of the sheet or web tension. In the transverse direction, however, the product can be wavy, and part of this waviness can still exist within the air pad. In order to compensate for this effect, the sensor can include two or more laser sensors operating on the basis of the triangulation method on at least one product side, in order not only to measure the distance to the product but also the angle between the product and the measuring sensors, either only in the transverse direction or both in the transverse direction and in the machine running direction. The misalignment between the upper and lower measuring sensor is measured by small receiving coils being arranged on one product side and a transmitting coil being arranged on the opposite product side. Another possibility of measuring the lateral misalignment is to provide a permanent magnet on one product side and Hall sensors on the other side. There are various alternative methods for measuring the lateral misalignment, If the angle between the sheet or web product and the measuring sensor is known both in the x direction and in the y direction, and the magnitude of the misalignment is known in the x and y directions, then a correction value for the thickness measurement can be calculated.

In particular, a sensor having stabilized air pads is also conceived.

For example, a laser measurement of the air pad thicknesses can be used for the control and/or regulation either of the flow to the air pads or the actuating force with which the air pad or the measuring sensor is pressed against the product, in order to stabilize the air pads at a specific thickness. This permits the use of simple segmented photodetectors instead of complete detector arrays. The segmented detectors are very small and can easily be used in a miniaturized optical design. They can be obtained either with two or four elements with a very small gap separating the elements from one another. The air pad can be subdivided in the x and y directions into segments, independent laser measurements of the air pad thickness and corresponding control and/or regulating systems for the air pad thickness being possible. In this way, the air pad thickness over the measuring sensor can be kept constant both in the x direction and in the y direction on both product sides (the measuring sensors are kept parallel to the product surface).

Moreover, an air pad sensor with a stabilized total gap is also conceived.

For example, in some cases it is advantageous if the total gap is regulated to a constant value. This can be achieved, for example, by the total gap being measured by way of one or more total gap sensors or one or more laser sensors on each side of the product, in order to carry out the air pad thickness measurement. Feedback from the total gap sensor can be used to regulate the air pad thicknesses in order to keep the total gap constant. Using a plurality of sensors and air pad control elements (flow control or force control), the measuring sensors can also be kept parallel to one another.

However, other types of configuration are also conceivable.

In a one embodiment of the sensor, air pads are provided on both product sides, as has been described further above. Further possible embodiments also emerge in particular from the claims.

The measuring device according to the present invention combines the accuracy which can currently only be achieved with contacting sensors with the advantages of an air pad sensor.

In the illustration according to FIG. 1, the thickness d of the sheet or web product 12 can lie in a range from about 100 to about 200 μm, for example.

In the arrangement according to FIG. 1, it is also possible to see air pad openings 18, by way which a respective air pad 16 can be produced. Moreover, it is possible to see an upper laser source 20 and a lower laser source 22 in each case. The respective window for the upper laser source 20 is designated "24", and the respective window for the lower laser source 22 is designated "26". The ferrite provided on the lower product side is in each case provided with the designation "28".

In FIG. 1, it is also possible to see the upper linear array 30 and the lower linear array 32.

FIG. 2 shows, in a schematic illustration, an embodiment of the measuring device 10 having lasers 34 and position measuring sensors 36 provided on both product sides. In addition, an active core 38 with a coil for the gap sensor can be seen on the upper side of the product 12. A passive ferrite disk 40 for the gap sensor is additionally arranged on the lower side of the product. Between the measuring sensors 14 on the two product sides and the product 12, an air gap 16 is again provided in each case.

The measuring sensors 14 provided on the two product sides are pressed against the product 12 while forming the respective air pad 16. In this case, the measuring sensors 14 provided on the two product sides can be pressed against the product 12 with at least substantially the same force, for example, but this is in no way mandatory. For example, the forces can also be different.

The thickness of the respective air pad 16 can be measured on both sides of the product 12. Moreover, the total gap thickness including the thickness of the two air pads 16 and the product thickness d (cf. also FIG. 1) can also be measured. In addition, elements are provided for calculating the product thickness d by subtracting the thickness of the air pad 16 on the two product sides from the measured total gap thickness.

FIG. 3 shows, in a schematic illustration, a further embodiment of measuring device 10, in which a plurality of sensors are provided for measuring the total gap thickness, in order to measure and compensate for the errors which have arisen as a result of a nonuniform gap between the measuring sensors.

In FIG. 3, lasers 34 and position detectors 36 can again be seen on the two product sides. In addition, gap sensors 33 are also again provided and, according to the illustration of FIG. 2, can for example respectively include an active core 38 with associated coil and a passive ferrite disk 40 on the opposite product side.

For the purpose of inductive measurement of the total gap thickness, a transmitting coil 42 can be provided on one product side and, on the other product side, one or more receiving coils 44 for determining the deviations in the xy direction.

FIG. 4 shows, in a schematic illustration, a further embodiment of measuring device 10, in which the sheet or web product 12 is pressed against a roll 46. On the product side facing away from roll 46, a laser 34 and a position measuring sensor 36 are again provided. In order to measure the total gap thickness, an eddy current sensor 48 is provided.

FIG. 5 shows, in a schematic illustration, a further embodiment of the measuring device 10, in which the sheet or web product 12 is pressed against a stationary surface 50. Lasers 34 and position measuring sensors 36 are again provided on the product upper side.

In order to measure the total gap thickness, a transmitting coil 42 is again arranged on one product side and one or more receiving coils 44 on the other product side.

FIG. 6 shows, in a schematic illustration, a further embodiment of the measuring device 10 having stationary measuring sensors 14 provided on both product sides.

As can be seen from FIG. 6, lasers 34 and position measuring sensors 36 are again provided on both product sides. For the purpose of inductive measurement of the total gap thickness, again a transmitting coil 42 is provided on one product side and one or more receiving coils 44 on the other product side.

The sheet or web product 12 can therefore be pressed against a stationary measuring sensor 14 while forming an air pad 16. In addition, elements for a laser measurement of the air pad thickness can be provided on one product side, and elements for a laser measurement, in particular of the distance from the measuring sensor on the opposite product side of the product surface, can be provided. Furthermore, elements can be provided for measuring the total gap thickness and elements can be provided for calculating the product thickness by subtracting the laser measured value from the measured value of the total gap thickness.

FIG. 7 shows, in a schematic illustration, a further embodiment of the measuring device 10 having stationary measuring sensors provided on both product sides. In this case, lasers 34 and position measuring sensors 36 are again provided on both product sides. For the purpose of inductive measurement of the total gap thickness, again a transmitting coil 42 can be provided on one product side and at least one receiving coil 44 on the other product side.

Therefore, stationary measuring sensors on both product sides and elements for a laser distance measurement from the measuring sensors provided on the two product sides to the product surface are again provided, it being possible for more than one laser measurement to be carried out on at least one product side in order to determine the angle between the product and the measuring sensor. Furthermore, elements can be provided for measuring the alignment between the measuring sensors to be used, it being possible for the relevant alignment management together with the angle measurement to be used to correct the misalignment. Finally, elements can also again be provided for measuring the thickness of the total gap between the measuring sensors, and also elements for calculating the product thickness by subtracting the air pad thickness from the measured value of the total thickness.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF DESIGNATIONS

10 Measuring device
12 Sheet or web product
14 Measuring sensor
16 Air pad
18 Opening
20 Upper laser source
22 Lower laser source
24 Window
26 Window
28 Ferrite
30 Upper linear array
32 Lower linear array
34 Laser
36 Position measuring sensor
38 Core with coil
40 Passive ferrite disk
42 Transmitting coil
44 Receiving coil
46 Roll
48 Eddy current sensor
50 Stationary surface

What is claimed is:

1. A device for measuring a thickness of one of a fiber sheet and a fiber web by way of optical measuring methods, said device comprising:
   at least one movable measuring sensor which can be pressed against the one of the fiber sheet and the fiber web while forming at least one air pad between said at least one movable measuring sensor and one of the fiber sheet and the fiber web, at least one said movable measuring sensor being provided on both sides of one of the fiber sheet and the fiber web; and
   a plurality of sensors to measure a total gap thickness and to measure and compensate for a plurality of errors resulting from a nonuniform gap between said movable measuring sensors.

2. The device of claim 1, wherein each of said at least one said movable measuring sensor is pressed against one of the fiber sheet and the fiber web with at least substantially a same force.

3. The device of claim 1, wherein said at least one air pad includes at least one air pad thickness which is measured on each of said both sides of one of the fiber sheet and the fiber web, a total gap thickness includes said air pad thickness on one of said both sides, said air pad thickness on another of said both sides and a product thickness of one of the fiber sheet and the fiber web, said total gap thickness is measured, and wherein elements are provided for calculating said product thickness by subtracting said air pad thickness on one of said both sides and said air pad thickness on another of said both sides from said total gap thickness.

4. The device of claim 1, wherein said at least one air pad is measured by way of a plurality of optical devices.

5. The device of claim 1, wherein said at least one air pad includes at least one air pad thickness which is measured by a laser.

6. The device of claim 1, wherein said at least one air pad includes at least one air pad thickness which is measured by a laser triangulation method.

7. The device of claim 1, wherein said at least one air pad includes a plurality of thickness changes which are registered indirectly by incorporating a plurality of air pad properties and an information about at least one of an air pressure and an air flow in a measuring gap.

8. The device of claim 1, further including a sensor which is based on one of magnetism and electromagnetism in order to measure a total gap thickness.

9. The device of claim 1, further including, for an inductive measurement of a total gap thickness, a transmitting coil on said one of said both sides and at least one receiving coil on said another of said both sides.

10. The device of claim 1, further including a magnetic reluctance sensor in order to measure a total thickness.

11. The device of claim 1, further including a capacitive sensor in order to measure a total gap thickness.

12. The device of claim 1, further including a short wavelength laser for a measurement of at least one said air pad to minimize a penetration of a laser beam of said short wavelength laser into one of the fiber sheet and the fiber web.

13. The device of claim 12, wherein said short wavelength laser is one of a blue wavelength laser, a violet wavelength laser and a ultraviolet wavelength laser.

14. The device of claim 1, further including a displacement sensor for measuring a misalignment between at least one said movable measuring sensor on one of said both sides of one of the fiber sheet and the fiber web and at least one said movable measuring sensor on another of said both sides of one of the fiber sheet and the fiber web.

15. The device of claim 14, further including a machine for producing one of the fiber sheet and the fiber web, said displacement sensor measuring said misalignment in a transverse direction of said machine.

16. The device of claim 14, further including a machine for producing one of the fiber sheet and the fiber web, said displacement sensor measuring said misalignment in both a transverse direction of said machine and a machine running direction.

17. The device of claim 14, wherein in order to measure an air pad thickness on at least one of said both sides, at least two laser sensors are provided which register an angle between said at least one measuring sensor and one of the fiber sheet and the fiber web in a transverse direction, and therefore compensate for an error which has arisen as a result of said misalignment.

18. The device of claim 14, wherein in order to measure an air pad thickness on at least one of said both sides, at least three laser sensors are provided which register an angle between said at least one movable measuring sensor and one of the fiber sheet and the fiber web both in a transverse direction and in a machine running direction, and therefore compensate for an error which has arisen as a result of said misalignment.

19. The device of claim 14, further including a separate sensor in order to measure said misalignment outside one of a thickness sensor and a thickness measuring device.

20. The device of claim 1, wherein said at least one air pad includes at least one air pad thickness which is one of controlled and regulated on a basis of a laser measurement.

21. The device of claim 1, wherein said at least one air pad includes at least one air pad thickness which is at least one of controlled and regulated by regulating an air flow to said at least one air pad.

22. The device of claim 1, wherein said at least one air pad includes at least one air pad thickness which is at least one of controlled and regulated by regulating a force acting on said at least one movable measuring sensor.

23. The device of claim 1, wherein said at least one air pad includes at least one air pad thickness which is at least one of controlled and regulated independently at least two points on said at least one movable measuring sensor.

24. The device of claim 1, wherein said at least one air pad includes at least one air pad thickness which kept constant with feedback from a plurality of laser sensors.

25. The device of claim 1, wherein said at least one air pad includes at least one air pad thickness which is kept constant with feedback from a measured value of a total gap thickness.

* * * * *

UNITED STATES PATENT AND TRADEMARK OFFICE
CERTIFICATE OF CORRECTION

PATENT NO.       : 7,319,521 B2
APPLICATION NO.  : 11/024331
DATED            : January 15, 2008
INVENTOR(S)      : Typpoe et al.

It is certified that error appears in the above-identified patent and that said Letters Patent is hereby corrected as shown below:

COLUMN 1
    At line 56, please delete "he", and substitute therefore --the--; and
    At line 58, please delete "epeatability", and substitute therefore --repeatability--.

Signed and Sealed this

Seventh Day of October, 2008

JON W. DUDAS
*Director of the United States Patent and Trademark Office*